United States Patent [19]
Kitami et al.

[11] Patent Number: 6,117,587
[45] Date of Patent: Sep. 12, 2000

[54] BATTERY AND BATTERY SUSPENDING JIG

[75] Inventors: Yasuo Kitami; Osamu Hasegawa, both of Wako; Tomoji Yoshizawa, Mohka; Shigeru Suzuki, Wako, all of Japan

[73] Assignee: Honda Giken Kogyo Kabushiki Kaisha, Tokyo, Japan

[21] Appl. No.: 08/928,387

[22] Filed: Sep. 12, 1997

[30]  Foreign Application Priority Data

Sep. 13, 1996  [JP]  Japan ................................. 8-242969

[51] Int. Cl.⁷ ............................ H01M 2/10; H01M 2/02
[52] U.S. Cl. ......................... 429/186; 429/187; 429/96; 429/100; 294/158; 294/903
[58] Field of Search ................. 429/96, 98, 99, 429/100, 187, 151, 159, 121, 225, 226, 228, 176; 16/DIG. 15, 114 R; 294/903, 158

[56]  References Cited

U.S. PATENT DOCUMENTS

| | | | |
|---|---|---|---|
| 4,042,762 | 8/1977 | Hakarine | 429/187 |
| 4,065,603 | 12/1977 | Coibion | 429/99 |
| 4,113,926 | 9/1978 | McBrien | 429/99 |
| 5,232,796 | 8/1993 | Baumgartner | 429/187 |
| 5,440,785 | 8/1995 | McDonald | 16/114 R |
| 5,637,420 | 6/1997 | Jones, Jr. et al. | 429/187 |
| 5,747,186 | 5/1998 | Morishita et al. | 429/53 |

*Primary Examiner*—Maria Nuzzolillo
*Assistant Examiner*—Mark Ruthkosky
*Attorney, Agent, or Firm*—Armstrong, Westerman, Hattori, McLeland & Naughton

[57]  ABSTRACT

A plurality of reinforcing ribs 8 and 9 are formed on an end wall of a battery container 2 of a battery B, and a pair of notches 11 are defined in the reinforcing rib 9 at an upper end. A battery suspending jig J has a pair of hooks 14 formed on a base plate 12 formed of a metal plate material. An attaching/detaching portion $14_1$ of the hook 14 is passed through an attaching/detaching bore $11_1$ of the notch 11 and then moved upwards, whereby an engage portion $14_2$ of the hook 14 is brought into engagement into an engage bore $11_2$ of the notch 11, and a receiving portion $14_3$ of the hook 14 is urged against a lower surface of the reinforcing rib 9. Thus, the battery B can be suspended and moved by connecting the battery suspending jig J to a chain block or a winch through a wire.

7 Claims, 15 Drawing Sheets

BATTERY AND BATTERY SUSPENDING JIG

BACKGROUND OF THE INVENTION

1. Field of the Invention

The present invention generally relates to a battery; such as, a lead battery used as, e.g., a power source for an electric vehicle, and a battery suspending jig used to move a battery in a suspended state.

2. Description of the Relevant Art

The battery used as the power source for an electric vehicle includes a battery container having one side open, an electrolytic liquid stored in the battery container, a top lid which covers the opening in the upper surface of the battery container, and an electrode mounted on a lower surface of the top lid and immersed in the electrolytic liquid. Such battery is too heavy to be directly lifted by a human being. For this reason, it is conventional practice to carry out the attachment or detachment of the battery to and from a vehicle by hanging up the battery by a chain block or winch whereby a hook is brought into engagement with an engaging portion provided on an upper surface of the top lid, or a side of the battery container is clamped.

However, if the engaging portion is provided on the upper surface of the top lid, the height of the battery is increased. Also, there is a possibility that when the hook is brought into engagement with the engaging portion to lift the battery, the weights of the battery container and the electrolytic liquid are applied to the weld zone between the battery container and the top lid. Consequently, the sealability of the weld zone is reduced. In a case where a plurality of batteries are disposed adjacent one another and are to be lifted by clamping the sides of the battery containers of the batteries, it is necessary to provide a gap which permits a clamping member to be inserted between the adjacent batteries for opening or closing thereof. For this reason, the number of the batteries capable of being disposed in a limited space is decreased.

An Ni-MH battery has a structure in which a plurality of battery cells are integrally coupled together. In such a battery having the plurality of battery cells integrally coupled together, if special considerations for suspending the battery are not provided, it is however difficult to mount the battery on a vehicle.

The present invention has been accomplished with the above circumstances in view, and it is an object of the present invention to ensure that a heavy battery can be easily and reliably suspended and mounted on a vehicle.

SUMMARY OF THE INVENTION

In order to achieve the above objective, a reinforcing rib protrudes outwards from a side wall of the battery container, and a suspending support portion formed on the reinforcing rib is supported to suspend the battery. Therefore, the weight of the battery cannot be applied to the junction between the battery container and the top lid. Moreover, the vertical dimension of the battery can be reduced as compared with a case where a support portion is provided on the top lid.

Furthermore, in the present invention, the plurality of battery cells and the pair of end plates are integrally coupled together by the band. Therefore, the batteries and the end plates can be firmly integrated with a reduced number of parts. In addition, the suspending support portion is formed on the reinforcing rib of the end plate. Therefore, a suspending load cannot be applied directly to the battery cells and moreover, to suspend the batteries, the vertical dimension of the battery cannot be increased.

Also in the present invention, the support portion is comprised of the notch which opens into the outer edge of the reinforcing rib. Therefore, the support portion cannot protrude from the reinforcing rib, and the lateral dimension of the battery can be decreased. Also the battery can be reliably suspended by utilizing the notch.

Further in the present invention, the plate-like hook is fitted from sideways into the notch to support the reinforcing rib. Therefore, the hook can be brought into engagement into the notch by a simple operation to reliably support the battery. In addition, the hook is of a plate-like shape and hence, even if there is only a narrow space around the outer periphery of the battery, the attachment or detachment of the battery suspending jig can be performed.

Moreover, in the present invention, if the battery suspending jig is moved laterally to cause the attaching/detaching portion of the hook to be passed through the attaching/detaching bore of the notch, and is then moved upwards to bring the engage portion of the hook into engagement into the engage bore of the notch, the receiving portion of the hook is urged against the lower surface of the reinforcing rib; thereby, causing the weight of the battery to be supported.

Further in the present invention, when the hook is brought into engagement into the notch, the lock member is urged against the upper surface of the reinforcing rib by a resilient force of the spring. Therefore, the downward movement of the hook is inhibited in order to prevent the hook from being removed from the notch.

Also in the present invention, the plurality of battery cells and the pair of the end plates are integrally coupled together by the band and therefore, the batteries and the end plates can be firmly integrated. In addition, the end plate is formed from the extruded material and hence, the cost is reduced. Moreover, since the suspending support portions are formed on the partition walls of the end plates, a suspending load cannot be applied directly to the battery cells; and further, the vertical dimension of the battery cannot be increased.

In the present invention, the pair of drilled bores can be made in the two partition walls by a single drilling operation, leading to a reduced number of working steps.

Also in the present invention, the pair of engaging portions of the hook are fitted into the pair of drilled bores and therefore, the battery can be reliably supported by a simple operation. In addition, the hook is fitted into the drilled bores within the end plate; and hence, even if there is no space around the outer periphery of the battery, the attachment or detachment of the battery suspending jig can be performed.

These and other features for carrying out the present invention will now be described by way of embodiments with reference to the accompanying drawings.

DETAILED DESCRIPTION OF THE PREFERRED EMBODIMENTS

FIGS. 1 to 7 illustrate a first embodiment of the present invention.

Figure 1:
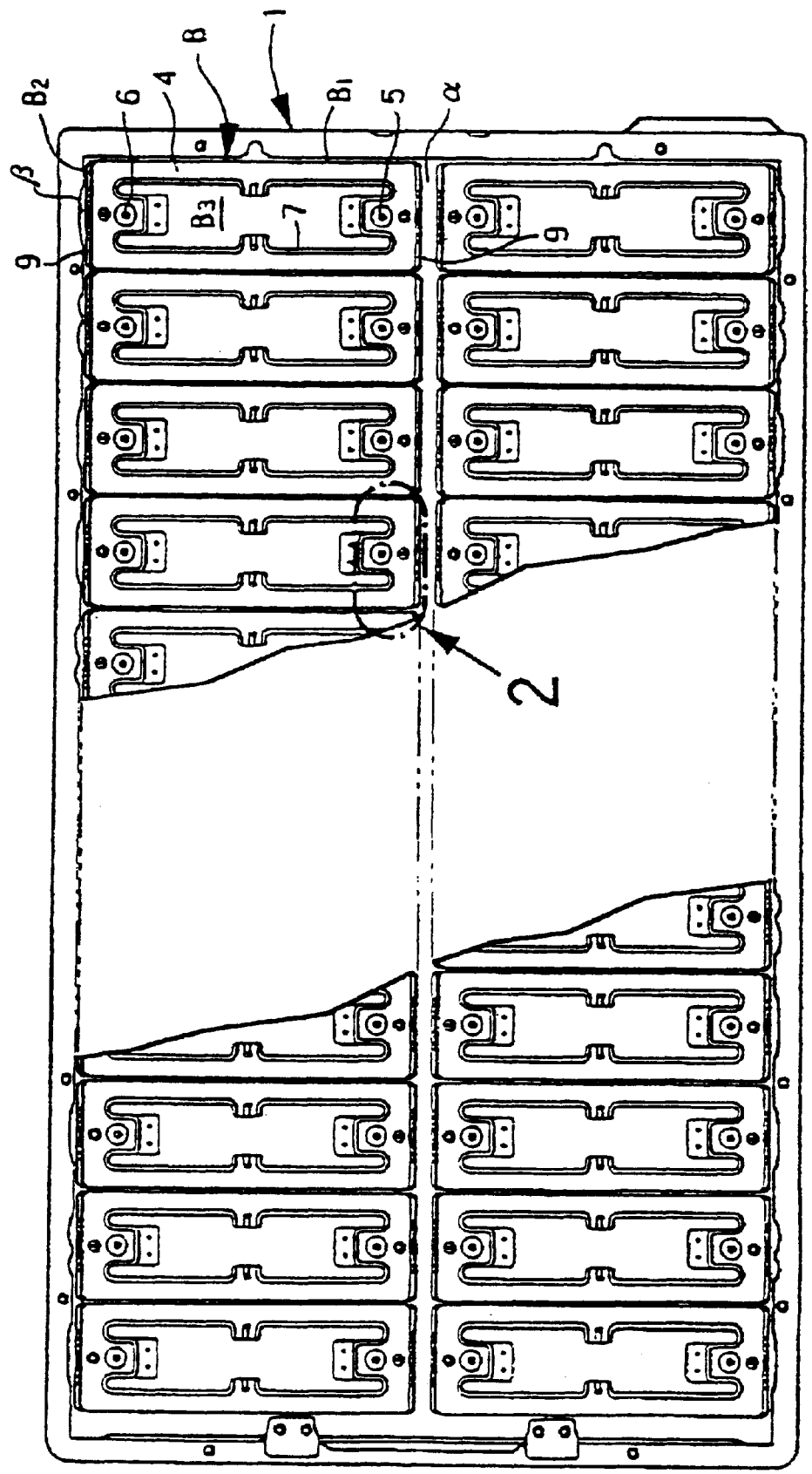
FIG. 1 is a plan view of a battery box in which batteries are accommodated.

As shown in FIG. 1, for example, 24 lead batteries B are mounted in 12 columns and 2 rows within a rectangular battery box 1 mounted in a predetermined position in an electric vehicle. The battery B is rectangular in planar shape. The 12 batteries B in each of rows are disposed in a state in which their sides $B_1$ are in contact with one another, and the 2 batteries B in each of the columns are disposed at a predetermined gap α left between their opposed ends faces $B_2$ and at a gap β between their other end faces $B_2$ and an inner wall of the battery box 1.

Figure 2:
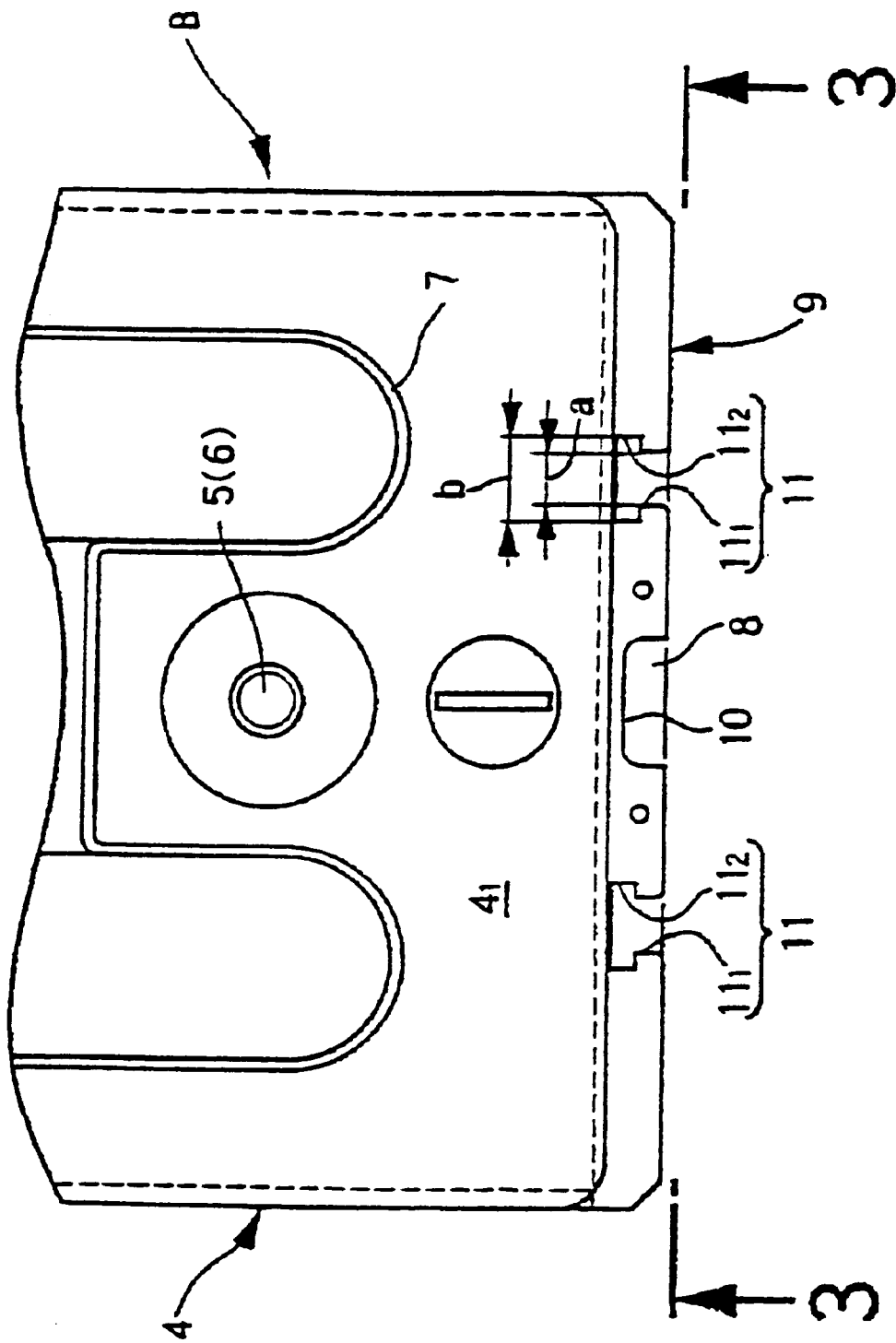
FIG. 2 is an enlarged view of a portion encircled by a dashed line 2 in FIG. 1.
Figure 3:
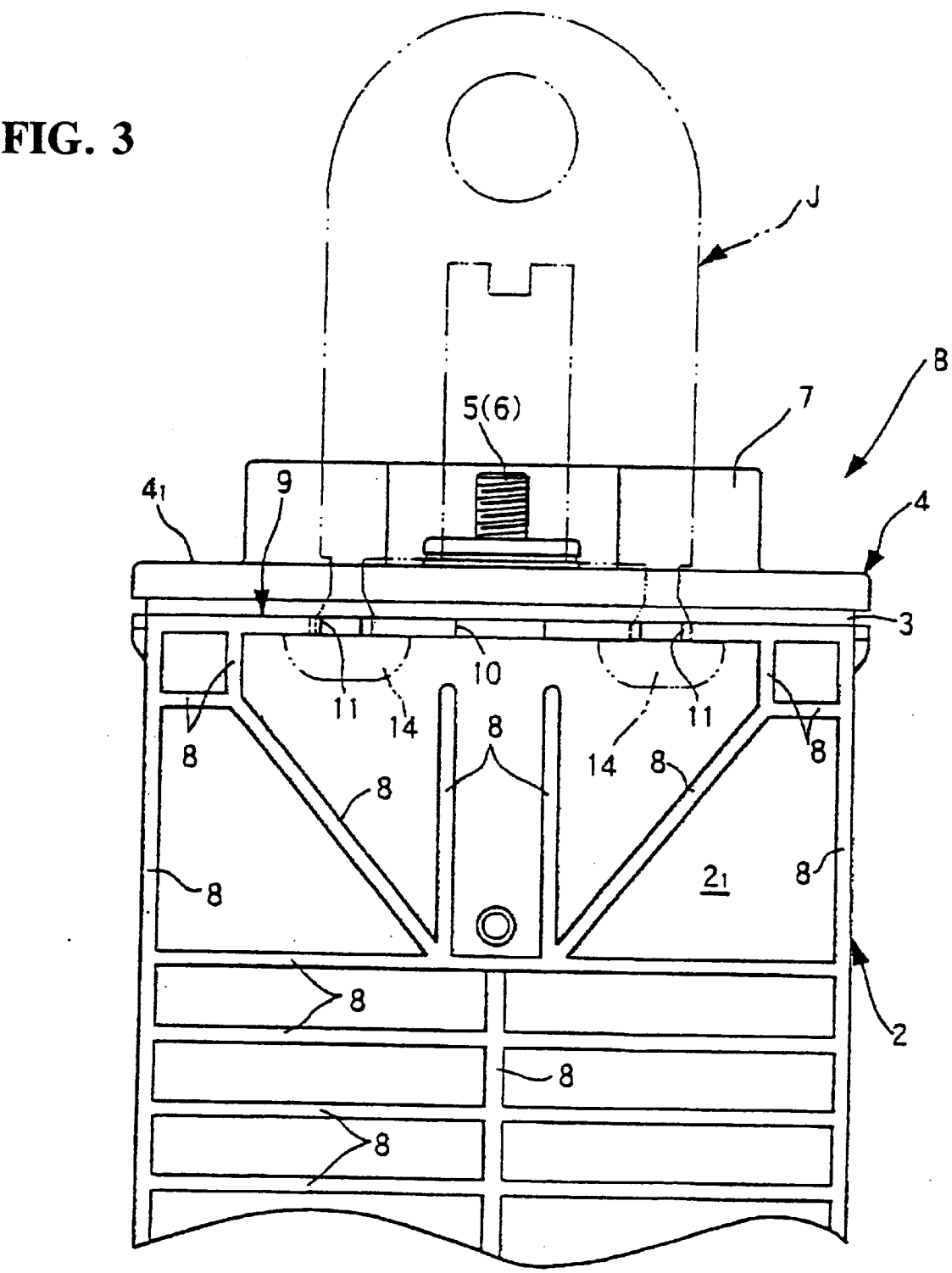
FIG. 3 is a view taken along a line 3—3 in FIG. 2.
Figure 6:
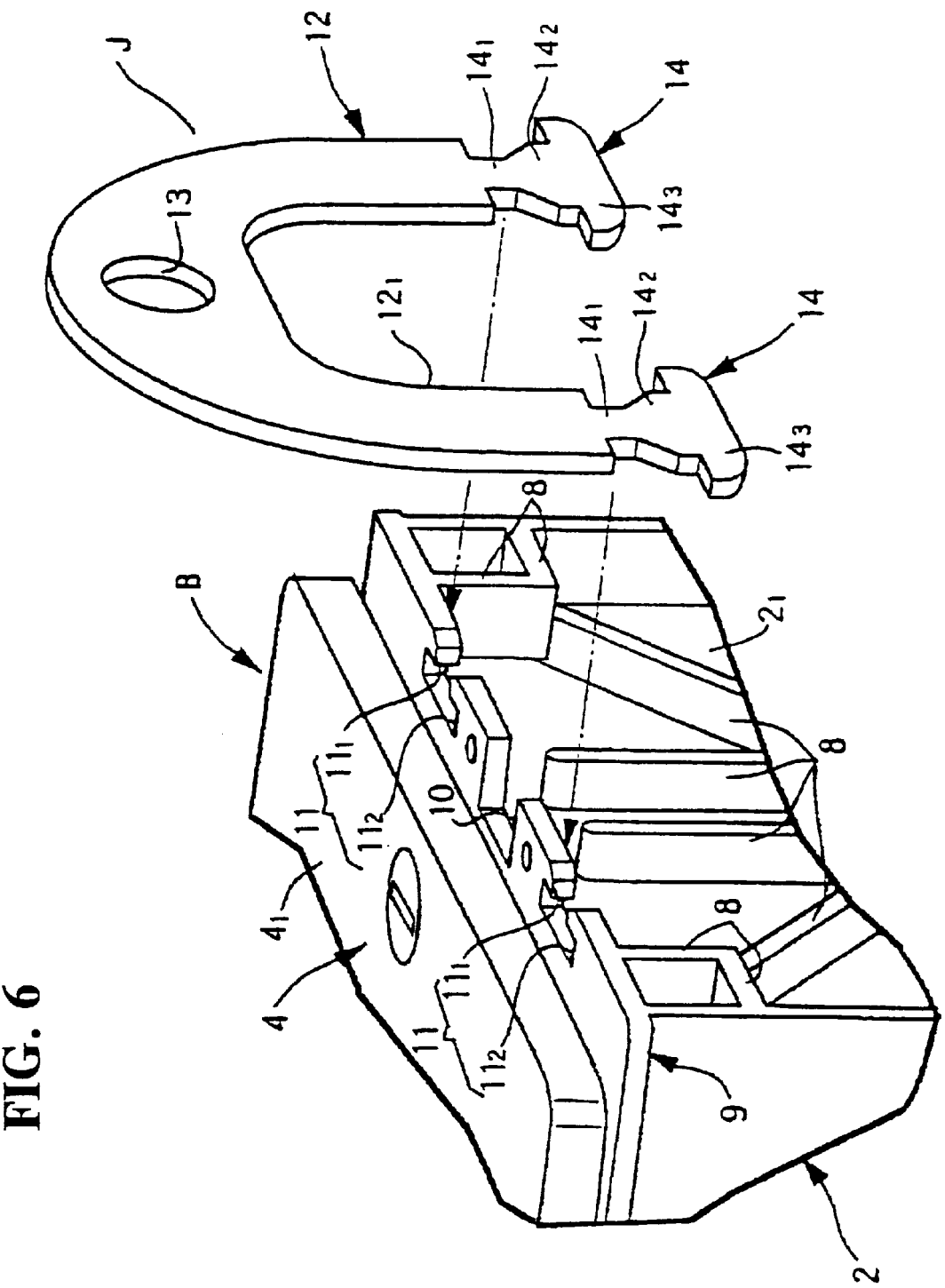
FIG. 6 is a perspective view of the battery and the battery suspending jig.

As can be seen from FIGS. 2, 3 and 6, the battery B includes a battery container 2 with its upper surface opened, and a top lid 4 coupled to an opening in the upper surface of the battery container 2 at a weld zone 3. A pair of electrodes 5 and 6 and a loop-like reinforcing rib 7 protruding upwards are formed on a flat wall surface $4_1$ of the top lid which forms an upper surface $B_3$ (see, FIG. 1) of the battery B. A plurality of reinforcing ribs 8 are formed longitudinally, laterally and obliquely on a flat wall surface $2_1$ of the battery container which forms the end face $B_2$ (see, FIG. 1) of the battery. A suspending reinforcing rib 9 protrudes horizontally at an upper end of the wall surface $2_1$ of the battery container along the weld zone 3 and integrally connected at opposite ends thereof to the reinforcing ribs 8. The reinforcing rib 8 and the suspending reinforcing rib 9 protrude in the same amount from the wall surface $2_1$ of the battery container and hence, tip ends of the reinforcing rib 8 and the suspending reinforcing rib 9 lie on the same plane parallel to the wall surface $2_1$ of the battery container.

A lightening notch 10 is defined at a central portion of the suspending reinforcing rib 9, and a pair of suspending notches 11 are defined at lateral opposite sides of the lightening notch 10. The suspending notches 11 have the same shape; and each of the suspending notches 11 is comprised of an attaching/detaching bore $11_1$ which opens into an end edge of the suspending reinforcing rib 9, and an engage bore $11_2$ connected to the attaching/detaching bore $11_1$. The lateral width a of the attaching/detaching bore 111 is smaller than the lateral. width b of the engage bore $11_2$.

Figure 4:
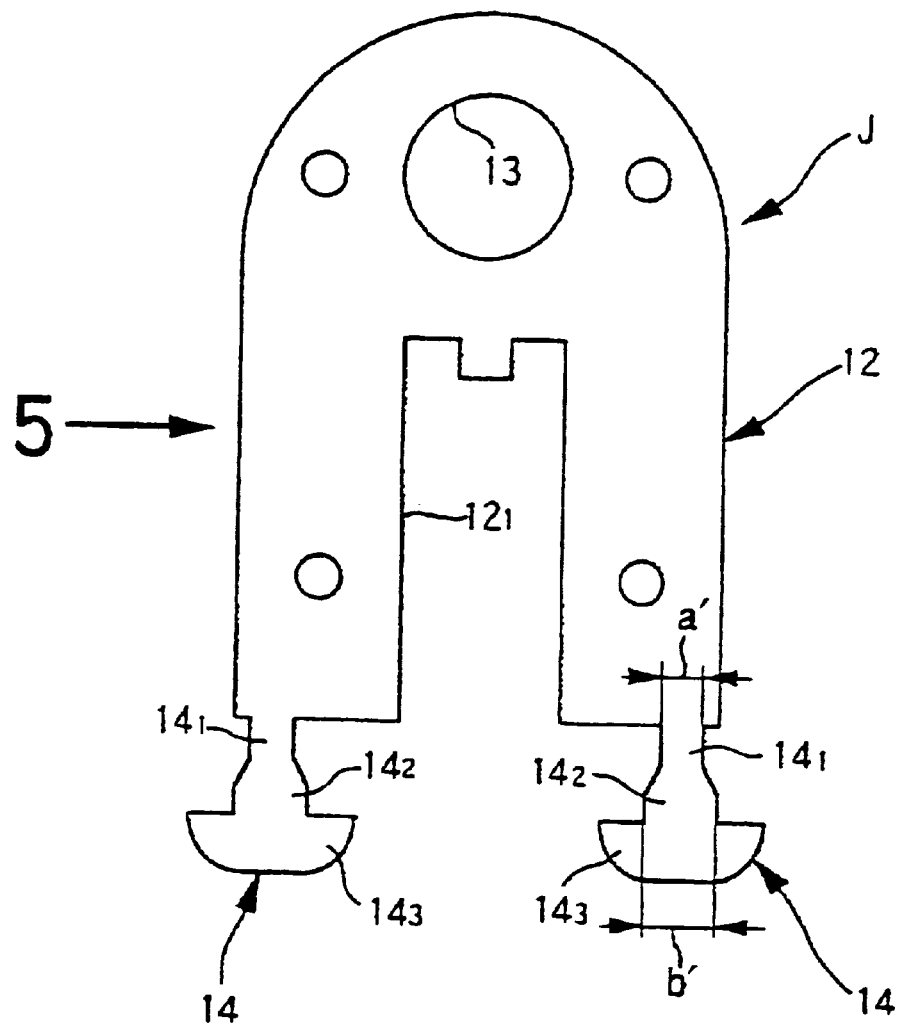
FIG. 4 is a front view of a battery suspending jig.
Figure 5:
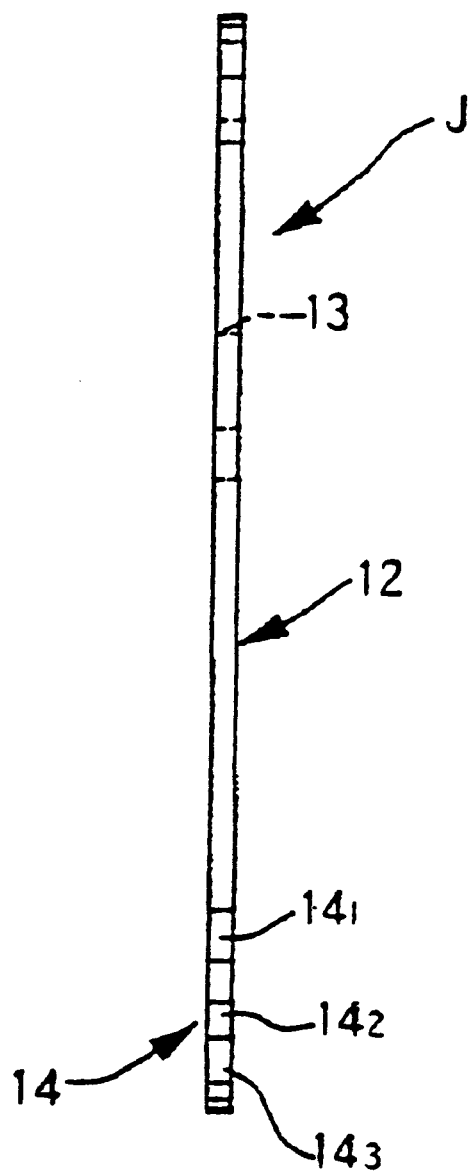
FIG. 5 is a view taken in a direction of an arrow 5 in FIG. 4.

As can be seen from FIGS. 4 to 6, the battery suspending jig J includes a base plate 12 formed into an U shape as a whole and produced by punching a metal plate material. A suspending member engage bore 13 for engagement of a suspending member F (see, FIG. 7) is defined at an end of the base plate 12; and a pair of hooks 14 having the same shape are formed at left and right lower ends of the base plate 12. Each of the hooks 14 is comprised of an attaching/detaching portion $14_1$, an engage portion $14_2$ connected to a lower end of the attaching/detaching portion $14_1$, and a receiving portion $14_3$ connected to a lower end of the engage portion $14_2$. The width a' of the attaching/detaching portion $14_1$ of the hook 14 is slightly smaller than the width a of the attaching/detaching bore $11_1$ of the suspending notch 11. The width b' of the engaging portion $14_2$ of the hook 14 is slightly smaller than the width b of the engaging bore $11_2$ of the suspending notch 11. The width of the receiving portion $14_3$ of the hook 14 is larger than the width b of the engaging bore $11_2$ of the suspending notch 11.

The operation of the embodiment of the present invention having the above-described structural arrangements is hereinafter described.

Figure 7:
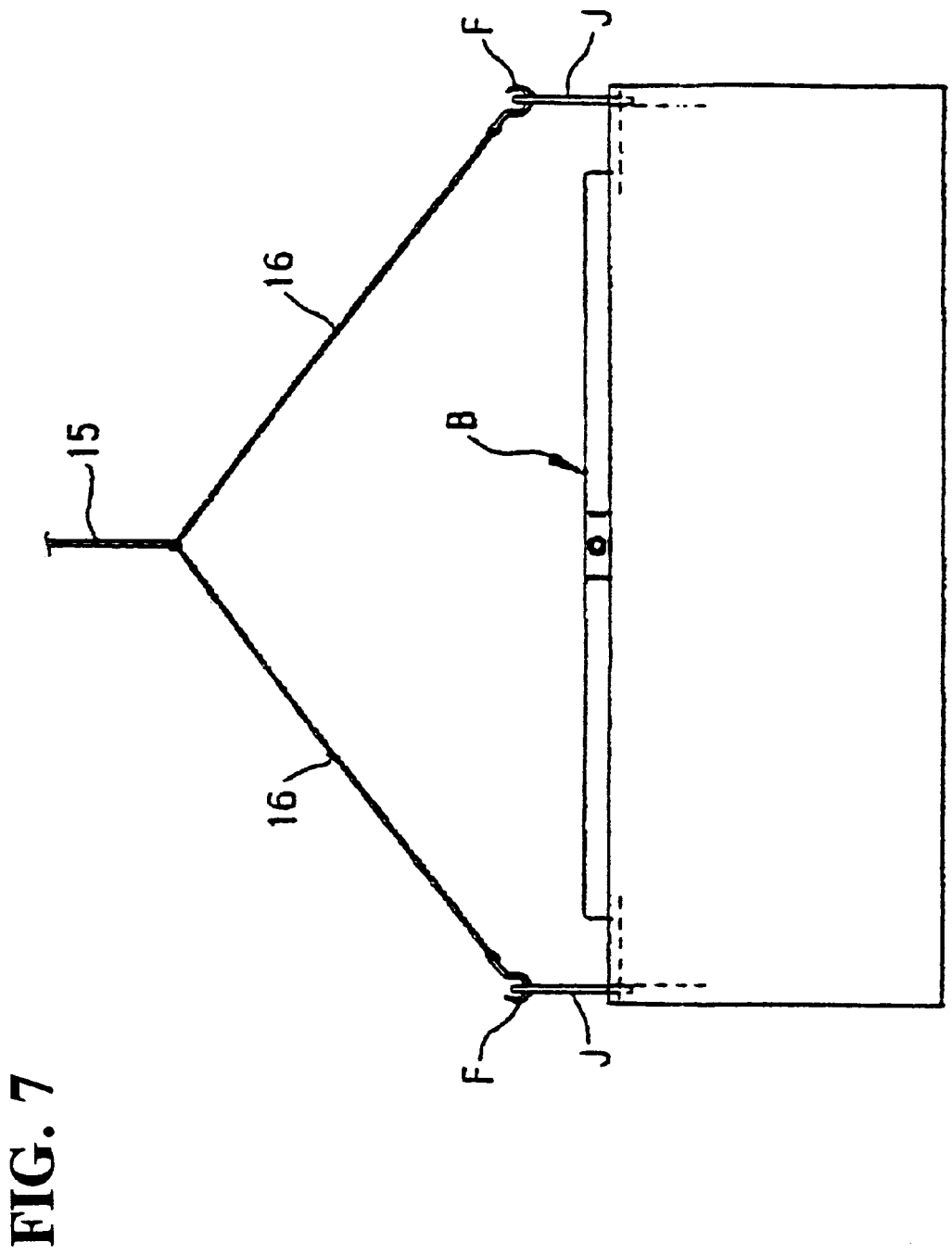
FIG. 7 is a view of the battery suspending jig in a used state.

As shown in FIG. 7, two wires 16 are diverted in two directions from a lower end of a wire 15 connected at its upper end to a chain block or a winch both of which are not shown. The suspending members F mounted at lower ends of the wires 16 are engaged into the suspending engage bores 13 in the battery suspending jigs J, respectively.

Each of the battery suspending jigs J is moved sideways toward the suspending reinforcing rib 9 at the end face $B_2$ of the battery B; thereby, causing the attaching/detaching portions $14_1$ of the hooks 14 of the battery suspending jig J to be passed through the attaching/detaching bores $11_1$ of the suspending notches 11; and then, the battery suspending jig J is moved upwards. This causes the engaging portions $14_2$ of the hooks 14 to be brought into engagement into the engaging bores $11_2$ of the suspending notches 11, and causes the receiving portions $14_3$ of the hooks 14 to abut against the lower surface of the suspending reinforcing rib 9. Consequently, the hooks 14 are prevented from being withdrawn upwards. If an attempt is made to move the battery suspending jigs J sideways from this state, the hooks 14 cannot be removed from the suspending notches 11 because the width a of the attaching/detaching bores $11_1$, connected to the engage bores $11_2$ of the suspending notches 11, is smaller than the width b' of the engage portions $14_2$ of the hooks 14.

Thus, the battery B can be reliably suspended and moved, as shown in FIG. 7, by using the two battery suspending jigs J in the above manner. To remove the battery suspending jig J from the battery B, the battery suspending jig J may be moved downwards relative to the suspending reinforcing rib 9, and then moved laterally away from the suspending reinforcing rib 9 in a state in which the attaching/detaching portions $14_1$ of the hooks 14 have been aligned with the attaching/detaching bores $11_1$ of the suspending notches 11.

When the battery B is mounted at a predetermined position within the battery box using the battery suspending jigs J, or when the battery B mounted at the predetermined position within the battery box 1 is transported using the battery suspending jigs J, the battery suspending jigs J can be attached or detached utilizing the gap α (see, FIG. 1) between the adjacent batteries B or the gap α (see, FIG. 1) between the battery and the inner wall of the battery box 1. In this case, the sizes of the gaps α and β may be equal to or larger than the thickness of the battery suspending jigs J. Moreover, an increase in volume of the battery box 1 to define the gaps α and β is slight because the thickness of the battery suspending jig J is not larger than the thickness of the metal plate material which is a blank for the battery suspending jig J.

As described above, the suspending notches 11 are defined in the suspending reinforcing rib 9 integrally formed on the battery container 2 of the battery B. Therefore, a load cannot be applied to the weld zone 3 between the battery container 2 and the top lid 4 during suspending of the battery B, and the generation of a sealing failure in the weld zone 3 can be prevented. Moreover, if special support portions for engagement of the hooks 14 are provided in the suspending notches 11, the number of parts are increased or the size of the battery B is increased. However, since the suspending notches 11 are defined directly in the suspending reinforcing rib 9, the number of parts and the size of the battery B are not increased.

FIGS. 8 to 12 illustrate a second embodiment of the present invention.

Figure 8:
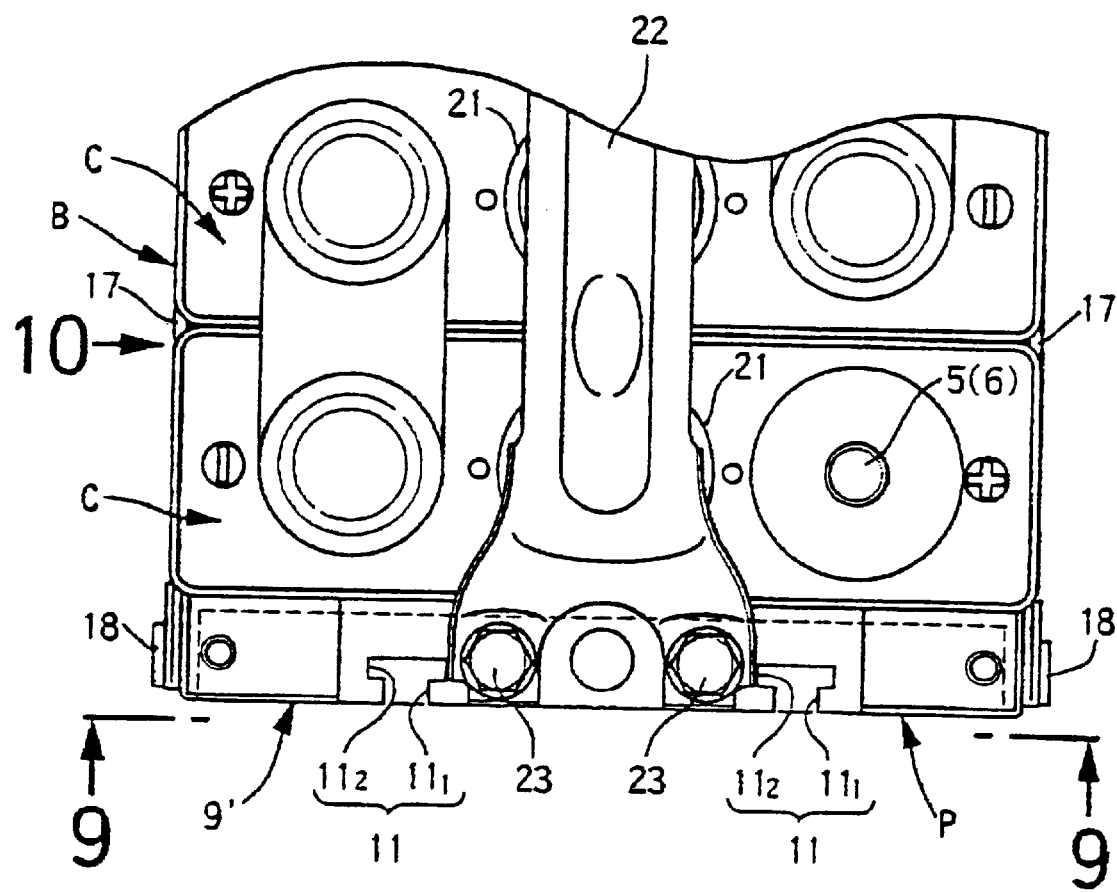
FIG. 8 is a view similar to FIG. 2, but according to a second embodiment of the present invention.
Figure 9:
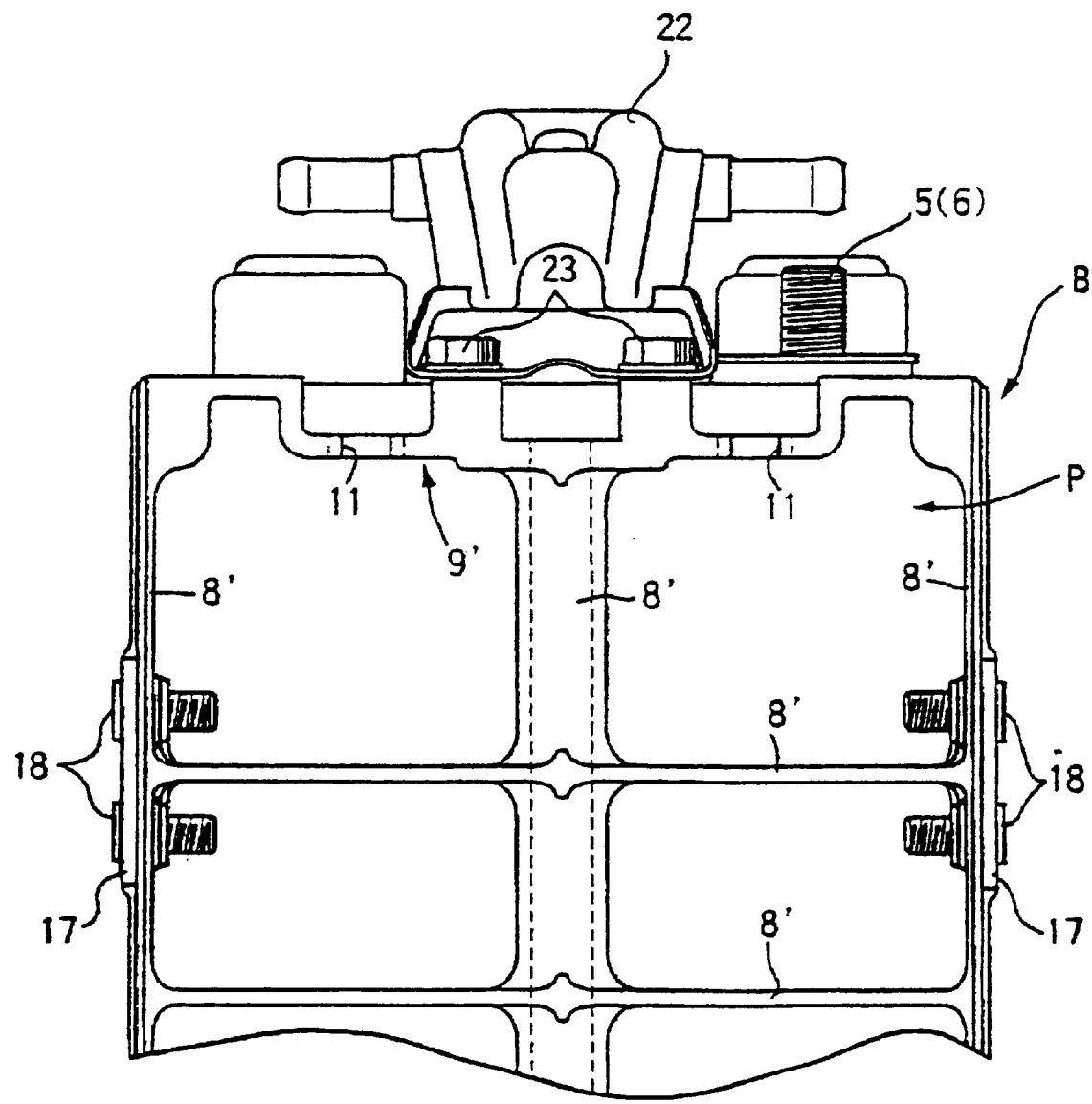
FIG. 9 is a view taken along a line 9—9 in FIG. 8.
Figure 10:
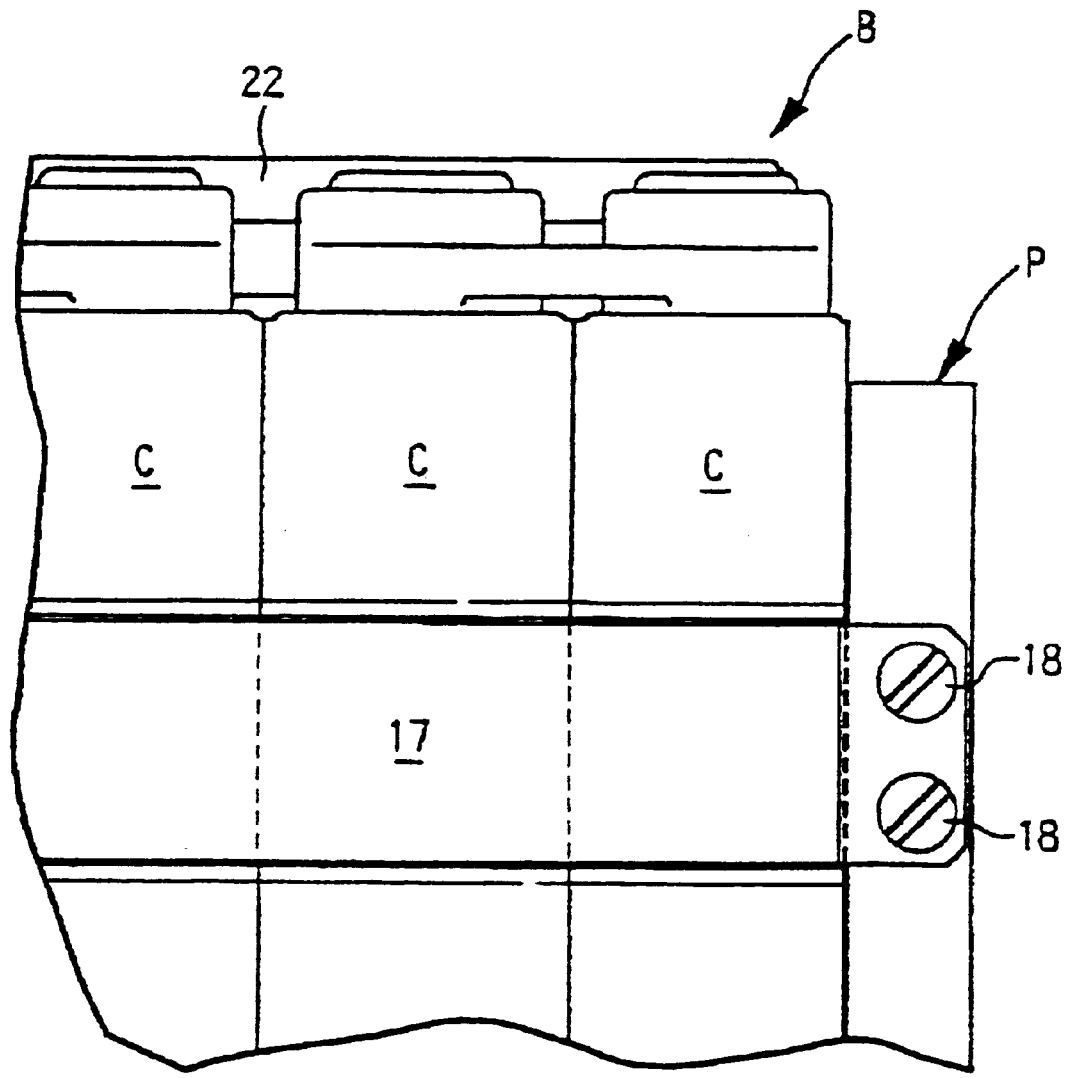
FIG. 10 is a view taken in a direction of an arrow 10 in FIG. 8.

A battery B, shown in FIGS. 8 to 10, is an Ni-MH battery used as a drive source for an electric vehicle and comprised of a plurality of battery cells C and a pair of end plates P integrally coupled together by four bands 17 with the end plates P disposed at opposite ends of the assembly of the battery cells C arranged in a straight line. More specifically, the two left bands 17 and the two right bands 17 made of a metal band plate are located along sides of the battery cells C and the end plates P and fixed at their ends to end faces of the end plates P by two bolts 18, respectively.

Thus, the battery cells C and the end plates P can be firmly, integrally coupled together in a simple and light-weight structure by the fact that the bands 17 are used in the above manner. In addition, when the batteries B are suspended, a load can be prevented from being applied to the battery cells C, but also the vertical dimension of the battery B can be reduced because it is unnecessary to provide a suspending engaging portion on an upper surface of each battery B.

Each of the end plates P is provided with a plurality of reinforcing ribs 8, and a suspending reinforcing rib 9' which is formed so that it is connected to upper ends of the reinforcing ribs 8. The suspending reinforcing rib 9' protrudes horizontally, and a cover 22 for covering upper portions of exhaust caps 21 are fixed at an end thereof to an upper surface of the suspending reinforcing rib 9' by bolts 23; and a pair of suspending notches 11 having the substantially same shape as the suspending notches 11 in the first embodiment are defined in the upper surface of the suspending reinforcing rib 9'.

Figure 11:
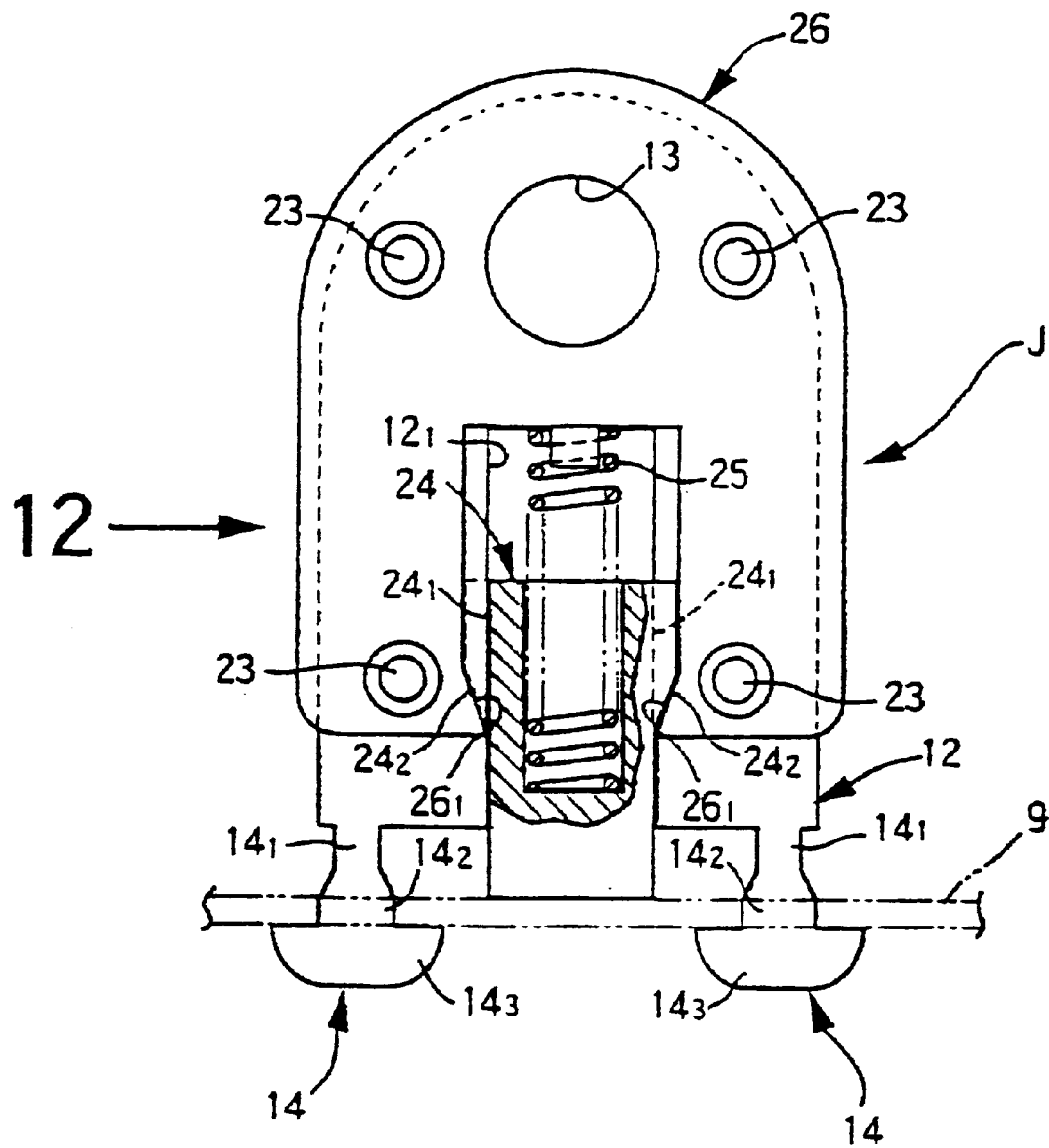
FIG. 11 is a front view of a battery suspending jig.
Figure 12:
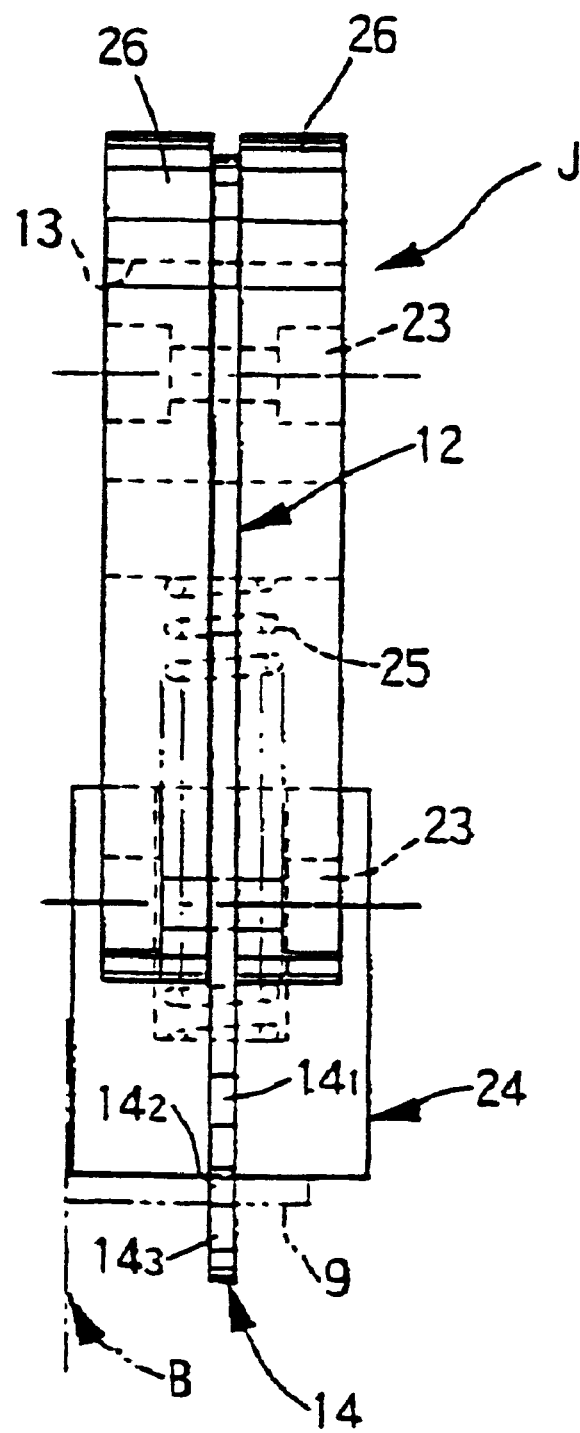
FIG. 12 is a view taken in a direction of an arrow 12 in FIG. 11.

As shown in FIGS. 11 and 12, the battery suspending jig J according to the second embodiment utilizes a base plate 12 as used in the first embodiment. Guide grooves $24_1$ defined in left and right sides of a lock member 24 are slidably engaged in an edge of an angular U-shaped notch 12 defined in the base plate 12 with its lower end opened. The lock member 24 is biased downwards by a resilient force of a spring 25 mounted between the lock member 24 and a bottom of the notch $12_1$. Covers 26 are fixed to opposite sides of the base plate 12 by four bolts 27, so that the end of the lowering movement of the lock member 24 is defined by abutment of stoppers $24_2$ provided on the lock member 24 against stoppers $26_1$ provided on the covers 26.

Two hooks 14 having substantially the same shape as those in the first embodiment are formed at a lower end of the base plate 12, and the lower end of the lock member 24 faces between the two hooks 14.

In order to bring the hooks 14 of the battery suspending jig J into engagement with the suspending notches 11 in the battery B, the battery suspending jig J is first pushed down, while compressing the spring 25 in a state in which the lower end of the lock member 24 has been pushed against an upper surface of the suspending reinforcing rib 9, and the base plate 12 is lowered to a position in which the attaching/detaching portions $14_1$ of the hooks 14 are opposed to the attaching/detaching portions $11_1$ of the suspending notches 11. From this state, the battery suspending jig J is slid laterally toward the battery B, and the pushing-down force applied to the battery suspending jig J is released after the attaching/detaching portions 14 of the hooks 14 have been passed through the attaching/detaching portions $11_1$ of the suspending notches 11. This permits the hooks 14 to be moved upwards by the resilient force of the spring 25, whereby the engage portions $14_2$ of the hooks 14 are engaged into the engage bores $11_2$ of the suspending notches 11.

When the hooks 14 have been engaged into the suspending notches 11 in the above manner, the hooks 14 cannot be released from the suspending notches 11 unless the base plate 12 is lowered against the resilient force of the spring 25. Therefore, the battery B can be further reliably suspended.

Figure 13:
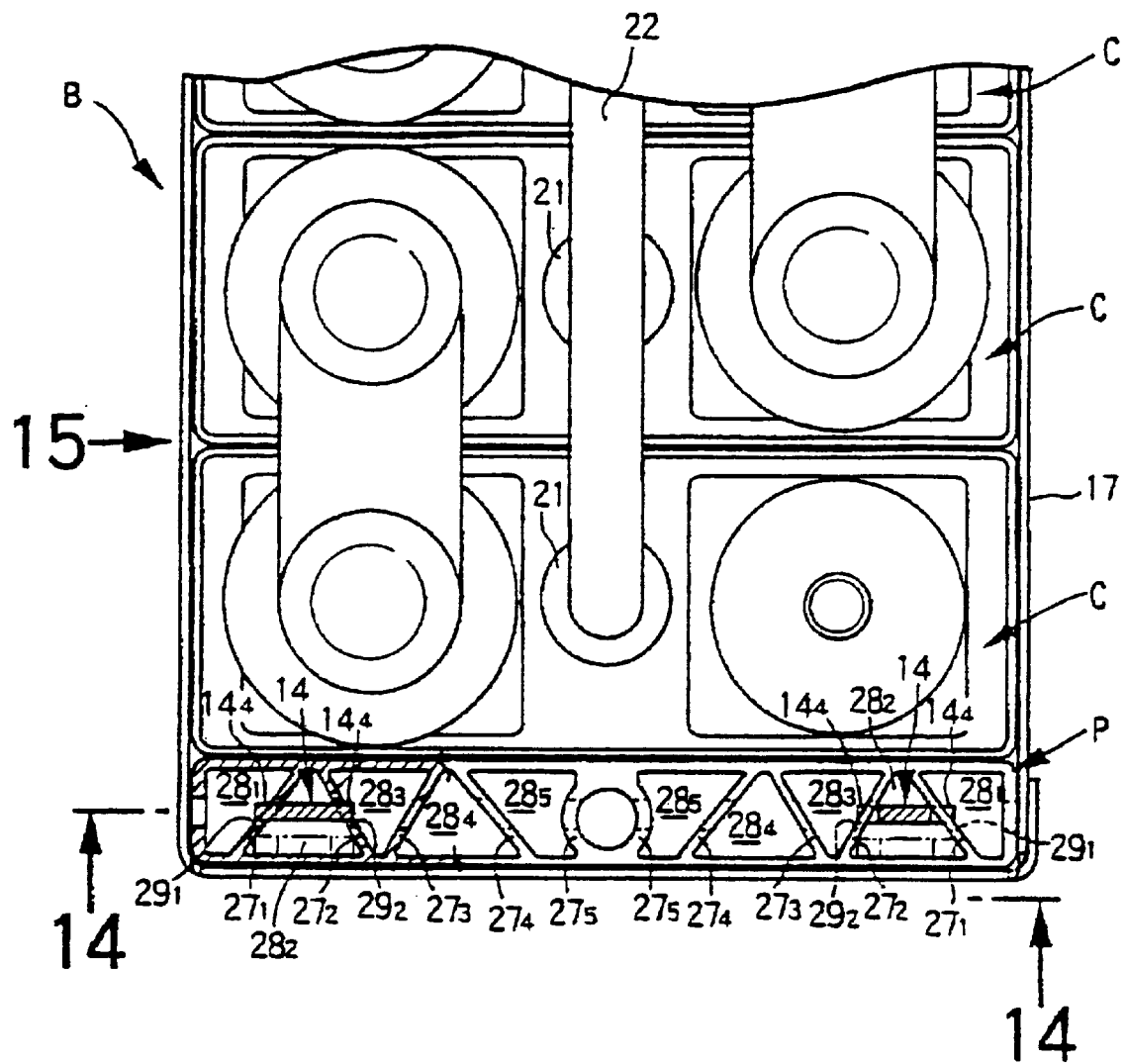
FIG. 13 is a view similar to FIG. 8, but according to a third embodiment of the present invention.
Figure 14:
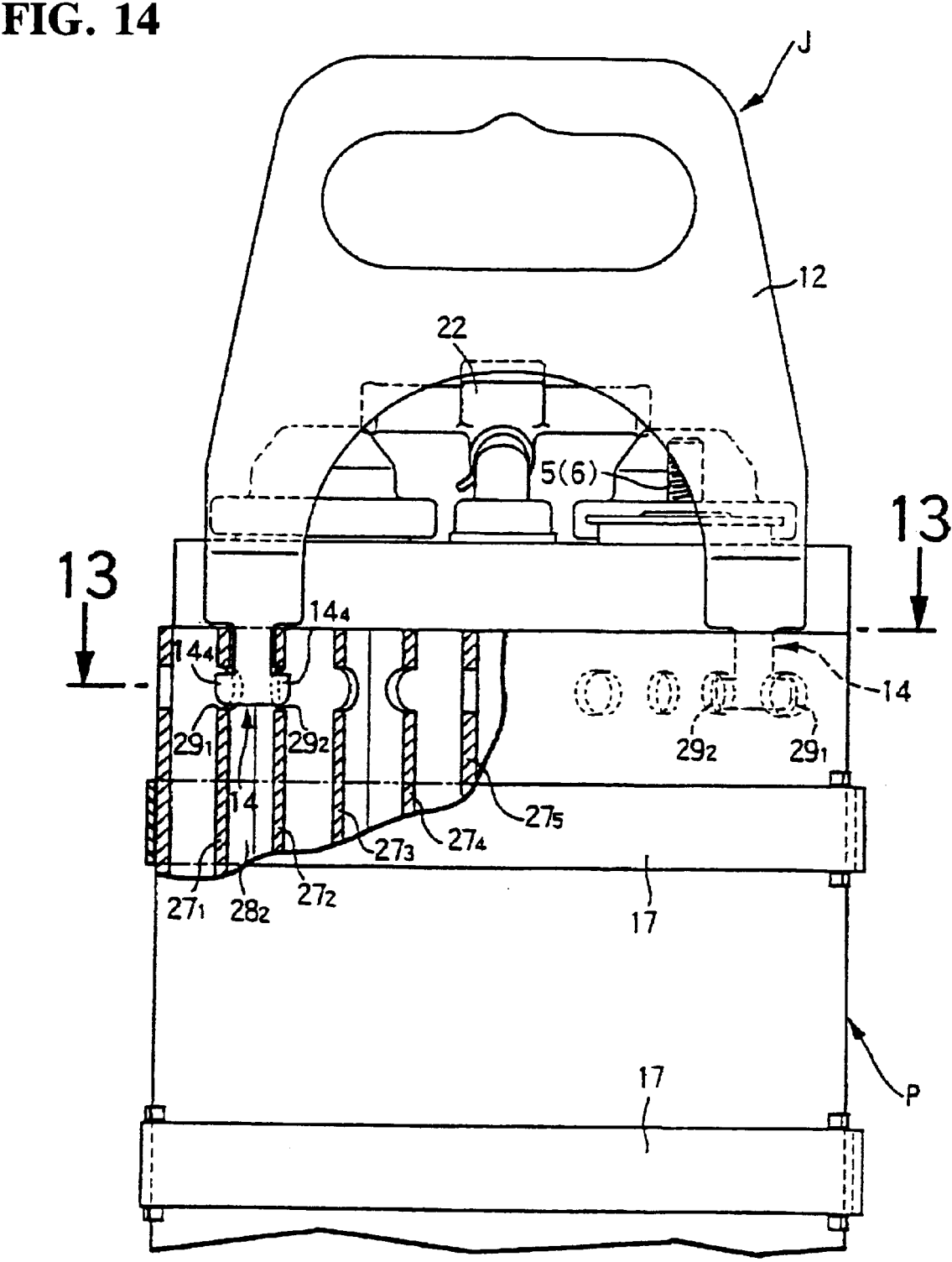
FIG. 14 is a view taken along a line 14—14 in FIG. 13.
Figure 15:
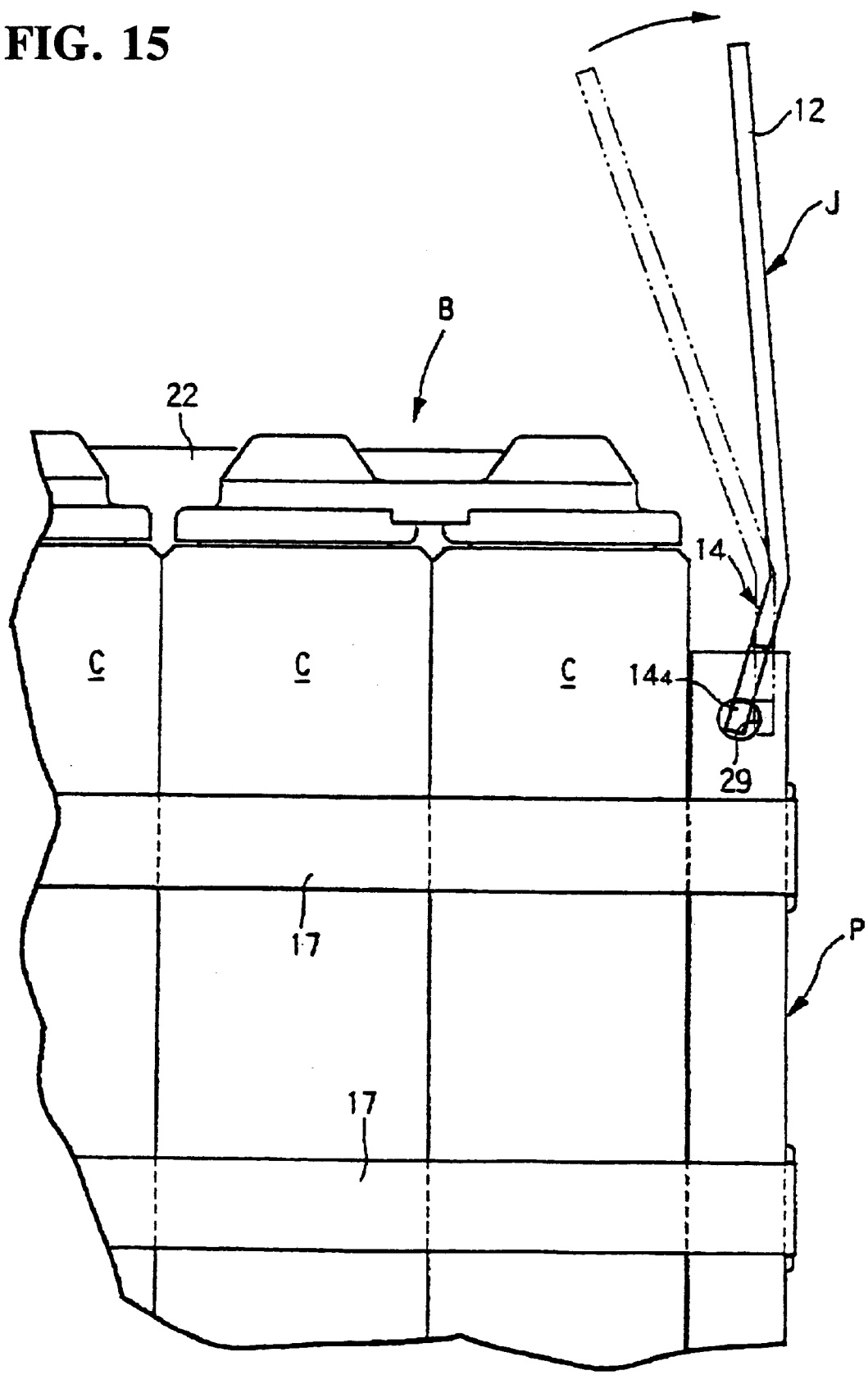
FIG. 15 is a view taken in a direction of an arrow 15 in FIG. 13.

FIGS. 13 to 15 illustrate a third embodiment of the present invention.

The battery B in the third embodiment is also an Ni-MH battery and comprised of a plurality of battery cells C and a pair of end plates P, which are integrally coupled together by three bands 17 made of a synthetic resin and formed into a loop, the end plates P being disposed at opposite ends of the assembly of the battery cells C arranged in a straight line.

Each of the end plates P is formed of a metal extruded material having a defined horizontal section, and has a plurality of through-bores $28_1$, $28_2$, $28_3$, $28_4$ and $28_5$, which are defined therein to extend vertically and isolated from one another by a plurality of partition walls $27_1$, $27_2$, $27_3$, $27_4$ and $27_5$. Drilled bores 29 are defined in the partition walls $27_1$, $27_2$, $27_3$, $27_4$ and $27_5$ in the vicinity of an upper end of the end plate P to extend coaxially through the partition walls $27_1$, $27_2$, $27_3$, $27_4$ and $27_5$ by machining a single drilled bore 29 (see, FIG. 15). Thus, the battery B is suspended utilizing the drilled bores $29_1$ and $29_2$ defined in the pair of partition walls $27_1$ and $27_2$ surrounding the two through-bores $28_2$.

The battery suspending jig J includes an inverted U-shaped base plate 12 made by punching a metal plate material. A pair of hooks 14 having the same shape are formed at left and right lower ends of the base plate 12. Each of the hooks 14 has a pair of engage portions $14_4$ formed thereon and bifurcated away from each other. The left and right lower ends of the base plate 12 are curved in the vicinity of the hooks 14.

The cross-sections of each of the two through-bores $28_2$ is formed into a triangle shape; and an outer portion (on the opposite side from the battery cell C) of each of these through-bores $28_2$ is wider. Therefore, the hook 14 of the battery suspending jig J can be inserted from above into such a wider portion, as shown by dashed lines in FIG. 14. If the upper end of the battery suspending jig J is pulled up from this state, the battery suspending jig J is turned from a position shown by dashed lines to a position, shown by a solid line in FIG. 15, because the battery suspending jig J is curved. As a result, the hooks 14 of the battery suspending jig J are moved inwards in the through-bores $28_2$ (toward the battery cell C; i.e., in a direction toward the partition walls $27_1$ and $27_2$, so that the engage portions $14_4$ thereof are brought into engagement into the drilled bores $29_1$ and $29_2$ in the partition walls $27_1$ and $27_2$.

If the battery B is suspended in this state, the battery suspending jig J is biased toward the position shown by the solid line by the own weight of the battery B; and hence, the engage portions $14_4$ of the hook 14 are strongly pushed into the drilled bores $29_1$ and $29_2$ and prevented from being fallen from the drilled bores $29_1$ and $29_2$.

In the third embodiment, the end plates P are suspended; and hence, a suspending load cannot be applied directly to the battery cells C. In addition, since the end plates P are formed of the extruded material, the cost can be reduced. Moreover, a total of four drilled bores $29_1$ and $29_2$ can be made by a single drilling operation; and hence, the working cost can be reduced. Further, the hook 14 is fitted into the drilled bores $29_1$ and $29_2$ within the end plate P; and hence, even if there is no space around an outer periphery of the battery B, the attachment or detachment of the battery suspending jig J can be performed.

With the battery defined in claim 1, the suspending support portion is formed on the reinforcing rib protruding outward from the side wall of the battery container; and hence, the battery can be suspended without mounting of a special support portion, but also the vertical dimension of the battery can be reduced, as compared to a case where a support portion is provided on the top lid. In addition, the weight of the battery is not applied to the junction between the battery container and the top lid; and hence, the sealability of the junction can be ensured.

With the battery defined in claim 2, the plurality of battery cells are disposed in a straight line; and the pair of end plates are disposed at the opposite ends of the assembly of the battery cells, the plurality of battery cells and the pair of end plates being coupled together by the band, and the suspending support portion is formed on the reinforcing rib which is provided on the end plate. Therefore, the batteries and the end plates can be firmly integrated with a reduced number of parts. In addition, a suspending load cannot be applied directly to the battery cells; and the vertical dimension of the battery cannot be increased.

With the battery defined in claim 3, the support portion is the notch which opens into the outer edge of the reinforcing rib. Therefore, the notch can be realized within the size of the reinforcing rib in order to decrease the lateral dimension of the battery; and also, the battery can be easily suspended by utilizing the notch.

With the battery suspending jig defined in claim 4, the plate-like hook fitted from sideways into the notch in the reinforcing rib for supporting the lower surface of the reinforcing rib is provided. Thus, the hook can be brought into engagement into the notch by a simple operation which involves only moving the battery suspending jig laterally toward the reinforcing rib. Moreover, the hook is of the plate-like shape; and hence, even if there is only a narrow space around the periphery of the battery, the attachment or detachment of the battery suspending jig can be performed.

With the battery suspending jig defined in claim 5, the notch of the reinforcing rib includes the attaching/detaching bore which opens into the outer edge of the reinforcing rib, 10 and the engage bore connected to the attaching/detaching bore and having the width larger than that of the opening of the attaching/detaching bore. The hook includes the attaching/detaching portion capable of being passed through the attaching/detaching bore from sideways, the engage portion which is formed below, connected to the lower portion of the attaching/detaching portion, capable of being brought into engagement into the attaching/detaching bore and having the width such that it cannot be passed through the attaching/detaching bore; and the receiving portion which is formed below and connected to the engage portion and capable of supporting the lower surface of the reinforcing rib. Thus, the hook can be brought into engagement into the notch by a simple operation which involves only moving the battery suspending jig laterally toward the reinforcing rib and then moving it upwards. Even if the battery suspending jig is moved laterally away from the reinforcing rib in such state, the hook cannot be removed from the notch.

With the battery suspending jig defined in claim 6, the lock member urged against the upper surface of the reinforcing rib by the spring in the state in which the hook is in engagement in the notch is provided. Thus, the hook can be biased upwards by a reaction force received from the reinforcing rib by the lock member; and hence, it can be prevented from being removed from the notch.

With the battery defined in claim 7, the plurality of battery cells are arranged in a straight line and the pair of end plates are disposed at opposite ends of the assembly of the battery cells. The plurality of battery cells and the pair of end plates are coupled together by the band. The end plate is formed from the extruded material having a through-bore extending vertically and divided by the at least two partition walls, and the suspending support portions are formed on the partition walls. Therefore, the batteries and the end plates can be firmly integrated with a reduced number of parts; and also, since the end plate is formed from the extruded material, the cost is reduced. In addition, the end plates are suspended; and hence, a suspending load cannot be applied directly to the battery cells. Moreover, the vertical dimension of the battery cannot be increased.

With the battery defined in claim 8, the support portions are a pair of drilled bores coaxially defined in the two partition walls. Therefore, the pair of drilled bores can be made in the two partition walls by a single drilling operation, leading to a decreased number of working steps.

With the battery suspending jig defined in claim 9, the hook having the pair of engage portions which are fitted into the pair of drilled bores is provided. Therefore, the battery can be reliably supported by a simple operation; and also, the hook is fitted into the drilled bores within the end plate. Hence, even if there is no space around the outer periphery of the battery, the attachment or detachment of the battery suspending jig can be performed.

Although the embodiments of the present invention have been described in detail, it will be understood that the present invention is not limited to the above-described embodiments, and various modifications in design may be made without departing from the spirit and scope of the invention defined in claims.

For example, the battery used as the power source for the electric vehicle has been illustrated in the embodiments, but the present invention is also applicable to a battery for driving auxiliaries in a vehicle using an internal combustion engine as a power source, and a battery used for the application other than the vehicle.

What is claimed is:

1. A battery suspending jig for suspending a battery, said battery including a battery container having one side open, a top lid for covering the opened side of said battery container, and a suspending support portion which is formed on a reinforcing rib protruding outwards from a side wall of said battery container, wherein said support portion is a notch which opens into an outer edge of said reinforcing rib, said jig comprising a plate-shaped hook fitted from sideways into said notch in said reinforcing rib for supporting a lower surface of said reinforcing rib, wherein said notch in said reinforcing rib comprises an attaching/detaching bore which opens into said outer edge of said reinforcing rib, and an engage bore connected to said attaching/detaching bore and having a width larger than that of the opening of said attaching/detaching bore, and wherein said hook comprises an attaching/detaching portion having a width smaller than the width of the attaching/detaching bore so that said attaching/detaching portion is capable of being passed through said attaching/detaching bore from sideways, an engaging portion capable of being brought into engagement into said attaching/detaching bore and having a width, measured in a same direction as the width of the attaching/detaching portion, which is larger than the width of the attaching/detaching bore such that the engaging portion cannot be passed through said attaching/detaching bore, and a receiving portion which is formed below and connected to said engaging portion and capable of supporting a lower surface of said reinforcing rib.

2. A battery suspending jig for suspending a battery, said battery including a battery container having one side open, a top lid for covering the opened side of said battery container, and a suspending support portion which is formed on a reinforcing rib protruding outwards from a side wall of said battery container, wherein said support portion is a notch which opens into an outer edge of said reinforcing rib, said jig comprising a plate-shaped hook fitted from sideways into said notch in said reinforcing rib for supporting a lower surface of said reinforcing rib, and a lock member urged against an upper surface of said reinforcing rib by a spring in a state in which said hook is in engagement in said notch.

3. A battery, comprising:

a plurality of battery cells arranged in a straight line and a pair of end plates disposed at opposite ends of the assembly of said battery cells, said plurality of battery cells and said pair of end plates being coupled together by a band, said end plate being formed from an extruded material having a through-bore extending vertically and divided by at least two partition walls, said partition walls having suspending support portions formed thereon.

4. A battery according to claim 3, wherein said support portions are a pair of drilled bores coaxially defined in said two partition walls.

5. A battery suspending jig for suspending a battery comprising a plurality of battery cells arranged in a straight line and a pair of end plates disposed at opposite ends of the assembly of said battery cells, said plurality of battery cells and said pair of end plates being coupled together by a band, said end plate being formed from an extruded material having a through-bore extending vertically and divided by at least two partition walls, said partition walls having a pair of drilled bores coaxially defined therein, wherein said battery suspending jig comprises a hook having a pair of engaging portions which are fitted into said pair of drilled bores.

6. A battery suspending jig for suspending a battery, said battery including a plurality of battery cells arranged in a straight line, a pair of end plates disposed at opposite ends of the assembly of said battery cells, said plurality of battery cells and said pair of end plates being coupled together by a band, and a suspending support portion formed on a reinforcing rib which is provided on said end plate, wherein said support portion is a notch which opens into an outer edge of said reinforcing rib, said jig comprising a plate-shaped hook fitted from sideways into said notch in said reinforcing rib for supporting a lower surface of said reinforcing rib, wherein said notch in said reinforcing rib comprises an attaching/detaching bore which opens into said outer edge of said reinforcing rib, and an engage bore connected to said attaching/detaching bore and having a width larger than that of the opening of said attaching detaching bore, and wherein said hook comprises an attaching/detaching portion having a width smaller than the width of the attaching/detaching bore so that said attaching/detaching portion is capable of being passed through said attaching/detaching bore from sideways, an engaging portion capable of being brought into engagement into said attaching/detaching bore and having a width, measured in a same direction as the width of the attaching/detaching portion which is larger than the width of the attaching/detaching bore such that the engaging portion cannot be passed through said attaching/detaching bore, and a receiving portion which is formed below and connected to said engaging portion and capable of supporting a lower surface of said reinforcing rib.

7. A battery suspending jig for suspending a battery, said battery including a plurality of battery cells arranged in a straight line, a pair of end plates disposed at opposite ends of the assembly of said battery cells, said plurality of battery cells and said pair of end plates being coupled together by a band, and a suspending support portion formed on a reinforcing rib which is provided on said en plate, wherein said support portion is a notch which opens into an outer edge of said reinforcing rib said jig comprising a plate-shaped hook fitted from sideways into said notch in said reinforcing rib for supporting a lower surface of said reinforcing rib, and a lock member urged against an upper surface of said reinforcing rib by a spring in a state in which said hook is in engagement in said notch.

* * * * *